United States Patent
Ogawa et al.

(10) Patent No.: US 7,928,170 B2
(45) Date of Patent: Apr. 19, 2011

(54) CYANATE ESTER, EPOXY RESIN AND CURING AGENT OF PHENOL RESIN AND EPOXY COMPOUND-MODIFIED POLYAMINE

(75) Inventors: Ryo Ogawa, Saitama (JP); Yoko Masamune, Saitama (JP); Shinsuke Yamada, Saitama (JP)

(73) Assignee: Adeka Corporation, Tokyo (JP)

( * ) Notice: Subject to any disclaimer, the term of this patent is extended or adjusted under 35 U.S.C. 154(b) by 0 days.

(21) Appl. No.: 12/665,472

(22) PCT Filed: Jun. 6, 2008

(86) PCT No.: PCT/JP2008/060462
§ 371 (c)(1),
(2), (4) Date: Dec. 18, 2009

(87) PCT Pub. No.: WO2009/001658
PCT Pub. Date: Dec. 31, 2008

(65) Prior Publication Data
US 2010/0204410 A1 Aug. 12, 2010

(30) Foreign Application Priority Data
Jun. 22, 2007 (JP) ................................. 2007-165437

(51) Int. Cl.
*C08K 3/22* (2006.01)
*C08L 63/02* (2006.01)

(52) U.S. Cl. .......................... 525/486; 523/428; 523/429

(58) Field of Classification Search ........................ None
See application file for complete search history.

(56) References Cited

FOREIGN PATENT DOCUMENTS

| JP | 53075299 | A |   | 7/1978 |
|----|----------|---|---|--------|
| JP | 60-144371 | A | * | 7/1985 |
| JP | 62265323 | A |   | 11/1987 |
| JP | 62265323 | W |   | 11/1987 |
| JP | 08012855 | A |   | 1/1996 |
| JP | 08012855 | W |   | 1/1996 |
| JP | 9-291268 | A | * | 11/1997 |
| JP | 10-45878 | A | * | 2/1998 |
| JP | 10130465 | A |   | 5/1998 |
| JP | 10130465 | W |   | 5/1998 |
| JP | 11140275 | A |   | 5/1999 |
| JP | 11140275 | W |   | 5/1999 |
| JP | 2000-232627 | A | * | 8/2000 |
| JP | 2004182851 | A |   | 7/2004 |
| JP | 2004182851 | W |   | 7/2004 |
| WO | PCTJP0860462 | R |   | 7/2008 |

* cited by examiner

*Primary Examiner* — Robert Sellers
(74) *Attorney, Agent, or Firm* — Millen, White, Zelano & Branigan, P.C.

(57) ABSTRACT

The present invention is one liquid type cyanate-epoxy composite resin composition comprised of cyanate ester resin (A), epoxy resin (B), and potential curing agent (C), characterized in that the above potential curing agent is the potential curing agent containing phenol resin (b) as well as modified amine (a) which has one or more amino groups having an active hydrogen within a molecule obtained by reacting polyamine compound (a-1) with epoxy compound (a-2). The one liquid type cyanate-epoxy composite resin composition having storage stability, curing properties and high heat resistance properties at the same time can be realized by this composition.

10 Claims, No Drawings

US 7,928,170 B2

CYANATE ESTER, EPOXY RESIN AND CURING AGENT OF PHENOL RESIN AND EPOXY COMPOUND-MODIFIED POLYAMINE

FIELD OF THE INVENTION

The present invention relates to one liquid type cyanate-epoxy composite resin composition, particularly to one liquid type cyanate-epoxy composite resin composition which is comprised of cyanate ester resin, epoxy resin and specific potential curing agent, and has excellent fast curing properties as well as storage stability.

BACKGROUND OF THE INVENTION

An epoxy resin composition has excellent electric performance and adhesivity, therefore, conventionally it has been used for various fields of electricity and electronics.

In addition, when sufficient heat resistance properties can not be obtained even though an conventional epoxy resin is used alone or in combination, high heat resistant cyanate-epoxy composite resin compositions comprised of mixing epoxy resin with cyanate ester resin are commonly used as sealing materials of semiconductor or used for moldings such as base board for electronic circuit etc.

However, liquid epoxy resin compositions used for sealing semiconductors comprised of cyanate ester, epoxy resin, inorganic filler and dihydrazide compound etc. (Patent document 1) had disadvantages in that a high temperature in curing or long curing time is required as well as each curing agent against cyanate ester and epoxy resin may be required, respectively.

Patent document 1: Japanese Unexamined Patent Publication Tokkai 2001-302767

It is proposed that an amine curing agent is used for the composite composition containing cyanate ester and epoxy resin (Patent document 2). However, in this case, there was a disadvantage in that sufficient storage stability was not obtained.

Patent document 2: Japanese Unexamined Patent Publication Tokkai-sho 60-250026

Furthermore, the heat curable resin composition, wherein a potential curing agent containing imidazole component is used with cyanate ester and epoxy resin, should be limited in the quantity of cyanate resin used to obtain sufficient stability (Patent document 3). Thus, a satisfactory heat curable resin composition has not been obtained yet.

Patent document 3: Japanese Unexamined Patent Publication Toku hyo 2001-506313

DISCLOSURE OF INVENTION

Problems to be Solved by the Invention

Therefore, the object of the present invention is to provide one liquid type cyanate-epoxy composite resin composition having excellent storage stability, curing properties and also high heat resistance properties.

Means to Solve the Problems

As a result of extensive studies, the inventors of the present invention found that extremely good results can be obtained when a potential curing agent containing a phenol resin, together with cyanate ester resin, epoxy resin, and specific modified amine which has one or more amino group having an active hydrogen within a molecule is used, thereby achieved the present invention.

Namely, the present invention is one liquid type cyanate-epoxy composite resin composition comprised of (A) cyanate ester resin, (B) epoxy resin, and (C) potential curing agent, characterized in that the above potential curing agent is a potential curing agent containing (b) phenol resin as well as (a) modified amine which has one or more amino group having an active hydrogen within a molecule obtained by reacting (a-1) polyamine compound with (a-2) epoxy compound.

Effects of the Invention

One liquid type cyanate-epoxy composite resin composition of the present invention has excellent storage stability and fast curing properties. Therefore, it can be widely used for a coating composition against concrete, cement, mortar, various types of metal, leather, glass, rubber, plastic, wood, cloth and paper etc., or for an adhesive agent. In addition, since one liquid type cyanate-epoxy composite resin composition of the present invention has high heat resistance properties and excellent adhesive properties in particular, it is suitably used for sealing materials to protect semiconductors, electronic materials to bond electronic parts etc. and furthermore automobile materials.

WORKING EMBODIMENT OF THE INVENTION

Examples of the component (A) of cyanate ester resin used for the present invention are the compounds represented by the following formula (I) or (II), but the component (A) is not particularly limited to them.

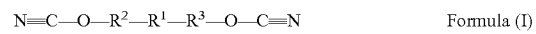

Formula (I)

$R^1$ in the formula is an unsubstituted or fluorine-substituted bivalent hydrocarbon group, $R^2$ and $R^3$ are independently an unsubstituted or a phenylene group substituted by 1-4 alkyl groups.

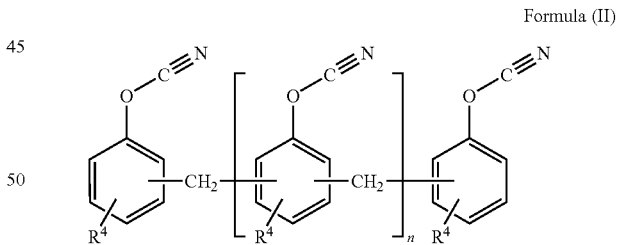

Formula (II)

n in the formula (II) is an integer of 1 or more, and $R^4$ is an hydrogen atom or an alkyl group having 1-4 carbon atoms.

Furthermore, the prepolymer, wherein a part of cyanate group of the compound in the formula (I) or (II) forms a triazine ring, can also be used as the component (A). Examples of such prepolymer are trimers of whole compound of the formula (I) or trimers formed by a part of the compound of the formula (I).

The compounds represented by the following formula (III) and their prepolymers are more preferable. In particular 4,4'-ethylidenebisphenylenecyanate, 2,2-bis(4-cyanatephenyl) propane and bis(4-cyanate-3,5-dimethylphenyl)methane are desirable.

Formula (III)

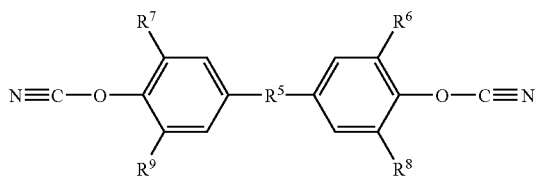

R⁵ in the formula (III) is:

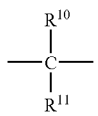

Wherein, $R^{10}$, $R^{11}$ are independently a hydrogen atom or an unsubstituted or fluorine-substituted methyl group. or

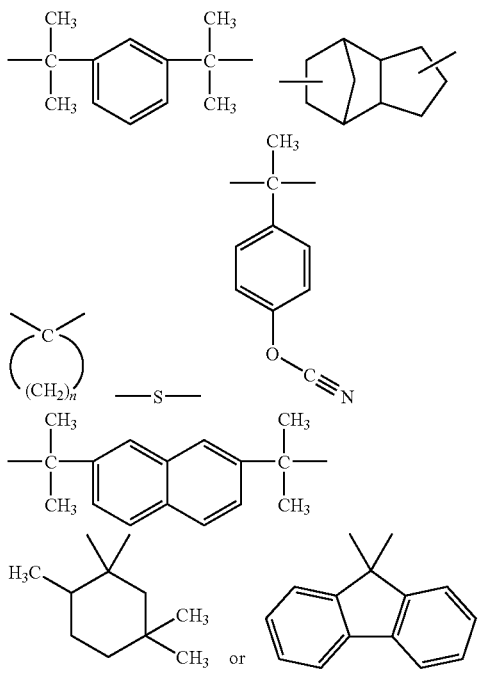

n is an integer of 4-12, $R^6$, $R^7$, $R^8$ and $R^9$ are independently an hydrogen atom, or an unsubstituted or fluorine-substituted methyl group.

These cyanate ester resins may be used alone, or two or more kinds thereof may be used in combination.

Examples of epoxy resin as component (B) used for the present invention are polyglycidyl ether compounds of mononuclear polyhydric phenol compounds such as hydroquinone, resorcin, pyrocatechol and phloroglucinol; polyglycidyl ether compounds of polynuclear polyhydric phenol compounds such as dihydroxy naphthalene, biphenol, methylene bisphenol (bisphenol F), methylene bis(orthocresol), ethylidene bisphenol, isopropylidene bisphenol (bisphenol A), isopropylidene bis(orthocresol), tetrabromo bisphenol A, 1,3-bis(4-hydroxy cumyl benzene), 1,4-bis(4-hydroxy cumyl benzene), 1,1,3-tris(4-hydroxyphenyl)buthane, 1,1,2,2-tetra (4-hydroxyphenyl)ethane, thiobisphenol, sulfobisphenol, oxybisphenol, phenolnovolac, orthocresolnovolac, ethylphenolnovolac, butylphenolnovolac, octylphenolnovolac, resorcinnovolac and terpenephenol; polyglycidyl ether compounds of polyhydric alcohols such as ethylene glycol, propylene glycol, butylene glycol, hexanediol, polyglycol, thiodiglycol, glycerine, trimethylol propane, pentaerythritol, sorbitol and bisphenol A-ethylene oxide addition compounds; glycidyl esters of aliphatic, aromatic or alicyclic polyacid such as maleic acid, fumaric acid, itaconic acid, succinic acid, glutaric acid, suberic acid, adipic acid, azelaic acid, sebacic acid, dimmer acid, trimer acid, phthalic acid, isophthalic acid, terephthalic acid, trimellitic acid, trimesic acid, pyromellitic acid, tetrahydrophthalic acid, hexahydrophthalic acid and endomethylene tetrahydrophthalic acid, and homopolymer or copolymer of glycidyl methacrylate; epoxy compounds having glycidylamino groups such as N,N-diglycidyl aniline, bis(4-(N-methyl-N-glycidylamino) phenyl)methane and diglycidyl ortho-toluidine; epoxidized compounds of cyclic olefin compounds such as vinylcyclohexane diepoxide, dicyclopentanediene diepoxide, 3,4-epoxy cyclohexylmethyl-3,4-epoxycyclohexane carboxylate, 3,4-epoxy-6-methylcyclohexylmethyl-6-methylcyclohexane carboxylate and bis (3,4-epoxy-6-methylcyclohexylmethyl) adipate; epoxidized conjugated diene polymers such as epoxidized polybutadiene and epoxidized styrene-butadiene copolymer; a heterocyclic compound such as triglycidylisocyanurate. These epoxy resins may be internally cross-linked by prepolymers having isocyanate groups at the ends thereof or may be high-molecularized by compounds having polyhydric active hydrogen (polyhydric phenol, polyamine, carbonyl group-containing compound and polyphosphate ester etc.).

It is preferable that the epoxy equivalent weight of polyepoxy compound is 70~3,000, and 90~2,000 is more preferable. Curing properties may decline when the epoxy equivalent weight is under 70, sufficient physical properties of coating may not be obtained when the epoxy equivalent weight is beyond 3,000, which is not preferable.

Examples of polyamine compound of the component (a-1) used for the present invention are aliphatic polyamines such as ethylenediamine, diethylene triamine, triethylenetetramine, tetraethylenepentamine, polyoxypropylenediamine and polyoxypropylenetriamine; alicyclic polyamines such as isoholondiamine, mensendiamine, bis(4-amino-3-methyldicyclohexyl)methane, diaminodicyclohexylmethane, bis (aminomethyl)cyclohexane, N-aminoethylpiperazine and 3,9-bis(3-aminopropyl)-2,4,8,10-tetraoxaspiro (5,5) undecane; mononuclear polyamines such as m-phenylenediamine, p-phenylenediamine, trilene-2,4-diamine, trilene-2,6-diamine, mesitylene-2,4-diamine, mesitylene-2,6-diamine, 3,5-diethyltrilene-2,4-diamine and 3,5-diethyltrilene-2,6-diamine; aromatic polyamines such as biphenylenediamine, 4,4-diaminodiphenylmethane, 2,5-naphthylenediamine and 2,6-naphthylenediamine; an imidazole such as 2-aminopropyl imidazole etc.

Among the above polyamine compounds, it is particularly desirable in the present invention to use (1) a diamine having two primary or secondary amino groups which differ in reactivity within a molecule and (2) at least one kind of polyamine selected from a polyamine having two or more primary or secondary amino groups within a molecule, wherein steric hindrance caused by the a a reaction of one of amino groups with an epoxy group deteriorates the reactivity of the remaining primary or secondary amino groups with an epoxy group, so that the adhesive properties and physical properties of the hardened substance in one liquid type cyanate-epoxy composite resin composition of the present invention can be improved.

Examples of diamine corresponding to the above (1) are isophoronediamine, menthanediamine, 2,2,4-trimethylhexamethylenediamine, 2,4,4-trimethylhexamethylenediamine and 1,2-diaminopropane. Examples of diamine corresponding to the above (2) are m-xylylenediamine and 1,3-bisaminocyclohexane etc. The present invention is not to be limited to these.

Furthermore, it is preferable in particular to use imidazole compounds containing a primary amino group, such as 2-aminopropylimidazole, as a polyamine compound of the above component (a-1) in the present invention from a viewpoint of improving curing properties at low temperature.

Examples of epoxy compounds of the component (a-2) used for the present invention are monoglycidyl ether compounds such as phenylglycidyl ether, allylglycidyl ether, methylglycidyl ether, butylglycidyl ether, secondary butylglycidyl ether, 2-ethylhexylglycidyl ether, 2-methyloctylglycidyl ether and stearylglycidyl ether; a monoglycidyl ester compound such as a versatic acid glycidyl ester; polyglycidyl ether compounds of mononuclear polyhydric phenol compounds such as hydroquinone, resorcin, pyrocatechol and phloroglucinol; polyglycidyl ether compounds of polynuclear polyhydric phenol compounds such as dihydroxy naphthalene, biphenol, methylenebisphenol(bisphenol F), methylenebis(orthocresol), ethylidene bisphenol, isopropylidene bisphenol (bisphenol A), isopropylidenebis (orthocresol), tetrabromo bisphenol A, 1,3-bis(4-hydroxy cumylbenzene), 1,4-bis(4-hydroxy cumylbenzene), 1,1,3-tris(4-hydroxyphenyl)buthane, 1,1,2,2-tetra(4-hydroxyphenyDethane, thiobisphenol, sulfobisphenol, oxybisphenol, phenol novolac, orthocresol novolac, ethylphenolnovolac, butylphenol novolac, octylphenol novolac, resorcin novolac and terpenephenol; polyglycidyl ether compounds of polyhydric alcohols such as ethylene glycol, propylene glycol, butylenes glycol, hexanediol, polyglycol, thiodiglycol, glycerine, trimethylol propane, pentaerythritol, sorbitol and bisphenol A-ethylene oxide addition products; glycidyl esters of aliphatic, aromatic or alicyclic polyacid such as maleic acid, fumaric acid, itaconic acid, succinic acid, glutaric acid, suberic acid, adipic acid, azelaic acid, sebacic acid, dimer acid, trimer acid, phthalic acid, isophthalic acid, terephthalic acid, trimellitic acid, trimesin acid, pyromellitic acid, tetrahydrophthalic acid, hexahydrophthalic acid and endomethylene tetrahydrophthalic acid, and homopolymers or copolymers of glycidylmethacrylate; epoxy compounds having glycidylamino groups such as N,N-diglycidyl aniline, bis(4-(N-methyl-N-glycidylamino) phenyl)methane and diglycidyl orthotoluidine; epoxidized compounds of cyclic olefin compounds such as vinylcyclohexenediepoxide, dicyclopentanedienediepoxide, 3,4-epoxycyclohexylmethyl-3,4-epoxycyclohexanecarboxylate, 3,4-epoxy-6-methylcyclohexylmethyl-6-methylcyclohexanecarboxylate and bis (3,4-epoxy-6-methylcyclohexylmethyl)adipate; epoxidized conjugated diene polymers such as epoxidized polybutadiene and epoxidized styrene-butadiene copolymer; a heterocyclic compound such as triglycidylisocyanurate.

In particular, polyglycidyl ether compounds having two or more epoxy groups within a molecule are preferable. Above all, polyglycidyl ethers of bisphenol compounds such as methylenebisphenol (bisphenol F), methylenebis (orthocresol), ethylidenebisphenol, isopropylidenebisphenol (bisphenol A) and isopropylidenebis (orthocresol) are preferable.

When a polyamine having a total of two or more amino groups by combining a primary amino group with a secondary amino group as the component (a-1) is used here, it is preferable that the component (a) is a modified polyamine obtained by the a a reaction of component (a-2) with component (a-1) wherein the amount of the former used relative to the 1 mol of the latter corresponds to the amount of 0.5~2, in particular 0.8~1.5 epoxy equivalent weight.

Additionally, the different modified amine compounds and/or imidazole compounds can be used in combination as the component (a-1), in the present invention, for example, a modified amine obtained by using a polyamine corresponding to the above (1) may be used with a modified amine obtained by using an imidazole compound.

Phenol resins of the component (b) used for the present invention are phenol resins synthesized by phenols and aldehydes. Examples of the above phenols are phenol, cresol, ethylphenol, n-propylphenol, isopropylphenol, butylphenol, tertiarybutylphenol, octylphenol, nonylphenol, dodecylphenol, cyclohexylphenol, chlorophenol, bromophenol, resorcin, catechol, hydroquinone, 2,2-bis(4-hydroxyphenyl)propane, 4,4'-thiodiphenol, dihydroxydiphenylmethane, naphthol, terpenephenol and phenolized di cyclopentadiene. The example of the above aldehydes is formaldehyde.

It is preferable that a number average molecular weight of phenol resin of the component (b) is 750-1,200 from a viewpoint to make one liquid type cyanate-epoxy composite resin composition of the present invention excellent in balance of storage stability and curing properties.

It is preferable that the quantity of the component (b) used is 10~100 mass parts relative to 100 mass parts of the component (a), in particular 20~60 mass parts is more preferable. When it is under 10 mass parts, curing properties of one liquid type cyanate-epoxy composite resin composition of the present invention may be poor, and when it is beyond 100 mass parts, the curing properties decline, which is not preferable.

As for the quantity of component (A) and (B) used in one liquid type cyanate-epoxy composite resin composition of the present invention, component (B) is 1~10,000 mass parts relative to 100 mass parts of component (A). 10~1,000 mass parts are preferable, and 20~500 mass parts are more preferable.

The quantity of component (C) used in one liquid type cyanate-epoxy composite resin composition of the present invention is 1~100 mass parts relative to the total amount of 100 mass parts of component (A) and (B). 5~60 mass parts are desirable.

Furthermore, it is preferable that the total quantity of components (A), (B) and (C) is 50 mass % or more of one liquid type cyanate-epoxy composite resin composition of the present invention.

One liquid type cyanate-epoxy composite resin composition of the present invention may be used as a solution by dissolving it in a various types of solvent, so that its treatment becomes easy. Examples of these solvents are ethers such as tetrahydrofuran, 1,2-dimethoxyethane and 1,2-diethoxyethane; alcohols such as iso- or n-buthanol, iso- or n-propanol etc., amyl alcohol, benzyl alcohol, furfuryl alcohol and tetrahydrofurfuryl alcohol; ketones such as methyethylketone, methylisopropylketone and methylbutylketone; aromatic hydrocarbons such as benzen, toluene and xylene; triethylamine, pyridine, dioxane, and acetonitrile etc.

The quantity of the above organic solvents used is 0~40 mass parts, preferably 0~20 mass parts relative to the total quantity of 100 mass parts of components (A), (B) and (C). When the said quantity used is beyond 40 mass parts, it is harmful as well as dangerous due to volatilization, which is not preferable.

One liquid type cyanate-epoxy composite resin composition of the present invention may contain fillers or pigments such as glass fiber, carbon fiber cellulose, siliceous sand, cement, kaolin, clay, aluminum hydroxide, bentonite, talk, silica, fine powder silica, titanium dioxide, carbon black, graphite, iron oxide and bituminous substance; thickners; thixotropic agents; flame retardants; defoamers; fungus resistance agents; commonly used additives such as colloidal silica and colloidal alumina, if necessary. In addition, sticky resins such as xylene resin and petroleum resin may be used together in combination.

One liquid type cyanate-epoxy composite resin composition of the present invention can be widely used for coating compositions against concrete, cement, mortar, various types of metal, leather, glass, rubber, plastic, wood, cloth, paper etc., or for adhesive agents. In addition, it is suitably used for sealing materials to protect semiconductors, electronic materials to bond electronic parts etc. and automobile materials.

One liquid type cyanate-epoxy composite resin composition of the present invention will now be described in more detail referring to manufacturing examples and examples, but the invention is not limited to these.

Manufacturing Example 1

Synthesis of Modified Polyamine 201 g of 1,2-diamino propane was introduced into a flask and heated to 60° C., then 580 g of the ADEKA RESIN EP-4100E (Commercial name of the product manufactured by ADEKA CORPORATION; it is a bisphenol A type epoxy resin, and its epoxy equivalent weight is 190. However, the epoxy equivalent weight of the ADEKA RESIN EP-4100E was 1.12 relative to 1 mol of 1,2-diaminopropane.) was added little by little in order to keep the temperature within the system at 100-110° C. After all of the ADEKA RESIN EP-4100E was added, the temperature of the a a reaction system was risen to 140° C., the a a reaction was carried out for 1.5 hours to obtain the modified polyamine. Then, 30 g of phenol resin was introduced into 100 g of the modified polyamine obtained, desolvation was carried out for an hour under the condition of 180~190° C. and 30~40 torr to obtain the potential curing agent (EH-1).

Manufacturing Example 2

Synthesis of Modified Polyamine 201 g of 1,2-diaminopropane used in the above manufacturing example 1 was changed to 352 g of isophoronediamine, then was reacted with 580 g of the ADEKA RESIN EP-4100E (Commercial name of the product manufactured by ADEKA CORPORATION; it is a bisphenol A type epoxy resin, and its epoxy equivalent weight is 190. However, the epoxy equivalent weight of the ADEKA RESIN EP-4100E was 1.47 relative to 1 mol of isoholondiamine.) to obtain modified polyamine. 30 g of phenol resin was introduced into 100 g of the modified polyamine obtained, desolvation was carried out for an hour under the condition of 180~190° C. and 30~40 torr to obtain the potential curing agent (EH-2).

Manufacturing Example 3

Synthesis of Modified Polyamine 201 g of 1,2-diaminopropane used in the above manufacturing example 1 was changed to 395 g of 4,4'-diaminodiphenylmethane, then was reacted with 580 g of the ADEKA RESIN EP-4100E (Commercial name of the product manufactured by ADEKA CORPORATION; it is a bisphenol A type epoxy resin and its epoxy equivalent weight is 190. However, the epoxy equivalent weight of the ADEKA RESIN EP-4100E was 1.53 relative to 1 mol of m-xylylenediamine.) to obtain modified polyamine. 30 g of phenol resin was introduced into 100 g of the modified polyamine obtained, desolvation was carried out for an hour under the condition of 180~190° C. and 30~40 torr to obtain the potential curing agent (EH-3).

Manufacturing Example 4

Synthesis of Modified Imidazole 201 g of 1,2-diaminopropane used in the above manufacturing example 1 was changed to 190 g of 2-ethyl-4-methylimidazole, then was reacted with 409 g of the ADEKA RESIN EP-4100E (Commercial name of the product manufactured by ADEKA CORPORATION; it is a bisphenol A type epoxy resin and its epoxy equivalent is 190. However, the epoxy equivalent weight of the ADEKA RESIN EP-4100E was 1.24 relative to 1 equivalent weight of active hydrogen of 2-ethyl-4-methylimidazole.) to obtain modified imidazole. It was confirmed that absorptions of 3,200~3,075 $cm^{-1}$, which appear based on N—H group of raw material, disappeared from the IR absorption spectrum of the obtained modified imidazole. Then, 30 g of phenol resin was introduced into 100 g of the above modified imidazole, desolvation was carried out for an hour under the condition of 180~190° C. and 30~40 torr to obtain the potential curing agent (EH-4).

EXAMPLES AND COMPARATIVE EXAMPLES

Cyanate ester resin (Cyanate LeCy; Commercial name of the product manufactured by Lonza Co.; it is represented as CE in the Tables), epoxy resin (EP-4901E: Commercial name of the product manufactured by ADEKA CORPORATION; it is a bisphenol F type epoxy resin and its epoxy equivalent weight is 168; it is represented as EP in the Tables.) and the potential curing agent obtained by the above manufacturing examples were blended as shown in the following Tables 1~2 to carry out the following tests. The results are shown in Tables 1~2 together.

(Viscosity)
Viscosity per 1 rpm at 25° C. was measured by using Brookfield E type rotation viscometer.

(Gel Time)
0.5 g of the composition obtained was dropped on a hot plate, wherein each measured temperature was maintained. While mixing with a spatula etc., the time until the fluidity of the composition disappeared was measured.

(Measurement by Differential Scanning Calorimeter (DSC, Glass Transition Point))
Measurement by DSC was carried out under 10° C./minute of temperature rising speed condition for 25-300° C. of scanning temperature range by using the differential scanning calorimeter DSC 6220 manufactured by SII Nano Technology Inc. Then the secondary temperature rising was carried out under the same condition, and the glass transition point was measured from the change of heat capacity.

(Adhesive Properties)
According to JIS K 6850, samples which were set between two steel plates were hardened at 100° C. for 30 minutes, then were hardened at 150° C. for one hour. Next, after cooling them to the room temperature, shear adhesive strength between the above bonded two steel plates was measured.

TABLE 1

|  | 1-1 | 1-2 | 1-3 | 1-4 | 1-5 | 1-6 |
| --- | --- | --- | --- | --- | --- | --- |
| Composition (g) | | | | | | |
| CE | 50 | 50 | 50 | 50 | 50 | 50 |
| EP | 50 | 50 | 50 | 50 | 50 | 50 |
| EH-1 | 55 | 27.5 | | | | |
| EH-2 | | | 55 | 27.5 | | |
| EH-3 | | | | | 55 | 27.5 |
| EH-4 | | | | | | |
| Evaluation results | | | | | | |
| Viscosity | | | | | | |
| Initial viscosity (mPa·s) | 8550 | 980 | 7670 | 809 | 7570 | 770 |
| Viscosity ratio (%) | | | | | | |
| 25° C. × 24 h | 101 | 100 | 101 | 100 | 101 | 100 |
| 25° C. × 168 h | 97 | 95 | 100 | 98 | 101 | 98 |
| 25° C. × 360 h | 101 | 101 | 93 | 92 | 100 | 100 |
| 25° C. × 672 h | 104 | 101 | 106 | 91 | 100 | 99 |
| 40° C. × 24 h | 101 | 96 | 105 | 101 | 100 | 99 |
| 40° C. × 168 h | 96 | 100 | 95 | 89 | 97 | 102 |
| 40° C. × 360 h | 102 | 107 | 93 | 107 | 101 | 105 |
| Gel time | | | | | | |
| 100° C. | 13 sec | 14 sec | 12 sec | 16 sec | 16 sec | 18 sec |
| 120° C. | 13 sec | 14 sec | 11 sec | 15 sec | 12 sec | 15 sec |
| 150° C. | 10 sec | 12 sec | 10 sec | 13 sec | 11 sec | 15 sec |
| DSC | | | | | | |
| Onset temperature of | 87.2 | 91.0 | 86.1 | 88.3 | 89.1 | 92.2 |
| Total exotherm (mJ/mg) | 552 | 655 | 563 | 667 | 558 | 670 |
| Tg (° C.) | 105.2 | 117.4 | 109.2 | 120.7 | 115.4 | 135.1 |
| Shear Adhesive Strength (MPa) | 16.6 | 16.9 | 17.0 | 17.2 | 16.8 | 17.0 |

TABLE 2

| | Comparative examples | | | | |
| --- | --- | --- | --- | --- | --- |
| | 1-1 | 1-2 | 1-3 | 1-4 | 1-5 |
| Composition (g) | | | | | |
| CE | 50 | 50 | | | |
| EP | 50 | 50 | 100 | 100 | 100 |
| EH-1 | | | 55 | | |
| EH-2 | | | | 55 | |
| EH-3 | | | | | |
| EH-4 | 20 | 10 | | | 20 |
| Evaluation results | | | | | |
| Viscosity | | | | | |
| Initial viscosity (mPa·s) | 610 | 421 | 17200 | 15120 | 14000 |
| Viscosity ratio (%) | | | | | |
| 25° C. × 24 h | 171 | 134 | 141 | 129 | 94 |
| 25° C. × 168 h | 370 | 233 | 120 | 125 | 96 |
| 25° C. × 360 h | 728 | 375 | 131 | 135 | 112 |
| 25° C. × 672 h | 3280< | 1074 | 124 | 125 | 362 |
| 40° C. × 24 h | 3280< | 1385 | 159 | 131 | 107 |
| 40° C. × 168 h | — | 4750< | 157 | 130 | 1550< |
| 40° C. × 360 h | — | — | 193 | 167 | — |
| Gel time | | | | | |
| 100° C. | 10 min 25 sec | 18 min 10 sec | 1 min 25 sec | 1 min 10 sec | 6 min 04 sec |
| 120° C. | 5 min 05 sec | 11 min 10 sec | 59 sec | 45 sec | 3 min 11 sec |
| 150° C. | 1 min 46 sec | 6 min 45 sec | 37 sec | 30 sec | 1 min 04 sec |
| DSC | | | | | |
| Onset temperature of exotherm (° C.) | 65.9 | 67.0 | 64.7 | 66.1 | 122.1 |
| Total exotherm (mJ/mg) | 632 | 722 | 234.3 | 266.4 | 446.0 |
| Tg (° C.) | 127.5 | 142.1 | 56.9 | 57.7 | 114.4 |
| Shear Adhesive Strength (MPa) | 15.1 | 16.3 | 13.7 | 16.7 | 14.6 |

As is clear from the results of the above Tables 1 and 2, it was confirmed that when the potential curing agent wherein only epoxy resin alone has active hydrogen was used (Comparative examples 1-3,4), heat resistance properties were poor since Tg was low, when the curing agent wherein epoxy resin alone does not have active hydrogen was used (Comparative Example 1-5), storage stability was poor since the thickening ratio was high, though heat resistance properties was excellent.

In addition, when epoxy resin was combined with cyanate resin (Examples 1-1~1-6, Comparative Examples 1-1,2), heat resistance properties were improved. However, it was confirmed that when the potential curing agent having no active hydrogen was used (Comparative Examples 1-1,2), storage stability was poor, gel time was long, and curing properties was not excellent since thickening ratio increased.

On the contrary, it was proved that when epoxy resin was combined with cyanate resin and the curing agent having active hydrogen was used (Examples 1-1,6), the composition having not only excellent heat resistance properties but also excellent storage stability and curing properties was obtained.

INDUSTRIAL APPLICABILITY

One liquid type cyanate-epoxy resin composition of the present invention has excellent storage stability and fast curing properties. Therefore, it can be widely used in a wide range of fields. In addition it can be suitably used for sealing materials to protect semiconductors, electronic materials to bond electronic parts etc. and automobile materials.

The invention claimed is:

1. One liquid cyanate-epoxy composite resin composition comprised of cyanate ester resin (A), epoxy resin (B), and potential curing agent (C), characterized in that the above potential curing agent is the potential curing agent containing phenol resin (b) as well as modified amine (a) which has one or more amino group having an active hydrogen within a molecule obtained by reacting the polyamine compound (a-1) with the epoxy compound (a-2).

2. One liquid cyanate-epoxy composite resin composition described in claim 1, wherein the polyamine compound of the above component (a-1) is (1) the diamine having two primary or secondary amino groups which differs in reactivity within a molecule, and/or (2) the polyamine having two or more primary or secondary amino groups within a molecule, in which steric hindrance caused by the reaction of one of amino groups with an epoxy group deteriorates the reactivity of the remaining primary or secondary amino groups with an epoxy group.

3. One liquid cyanate-epoxy composite resin composition described in claim 1, wherein the polyamine compound of the above component (a-1) is the 2-aminopropylimidazole compound.

4. One liquid cyanate-epoxy composite resin composition described in claim 1, wherein the epoxy compound of the above component (a-2) is the polyglycidylether compound having two or more epoxy groups within a molecule.

5. One liquid cyanate-epoxy composite resin composition described in claim 1, wherein the modified polyamine of the above component (a) is the modified polyamine obtained by reacting 0.5~2 equivalent weight of the component (a-2) with 1 mol of the component (a-1).

6. One liquid cyanate-epoxy composite resin composition described in claim 1, wherein the number average molecular weight of the phenol resin of the above component (b) is 750~1,200.

7. One liquid cyanate-epoxy composite resin composition described in claim 1, wherein 10~100 mass parts of phenol resin of the component (b) is used relative to 100 mass parts of polyamine of the component (a).

8. One liquid cyanate-epoxy composite resin composition described claim 1, wherein 1~10,000 mass parts of epoxy resin of the component (B) is used relative to 100 mass parts of cyanate ester resin of the component (A).

9. One liquid cyanate-epoxy composite resin composition described in claim 1, wherein a cyanate ester resin of the component (A) is comprised of at least one kind of compound selected from the group consisting of compounds represented by the following formula (I), (II) and prepolymers thereof;

$R^1$ in the formula is a bivalent unsubstituted or fluorine-substituted hydrocarbon group, $R^2$ and $R^3$ are independently an unsubstituted phenylene group or a phenylene group substituted by 1~4 alkyl groups, Formula (II)

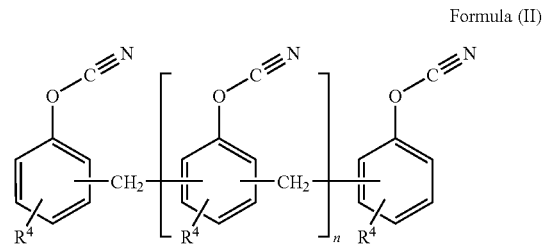

n in the formula is an integer of 1 or more, $R^4$ is a hydrogen atom or an alkyl group having 1~4 carbon atoms.

10. One liquid cyanate-epoxy composite resin composition described in claim 1, wherein a cyanate ester resin of the component (A) is at least one kind of compound selected from the group consisting of the compound represented by the following formula (III) and prepolymers thereof, Formula (III)

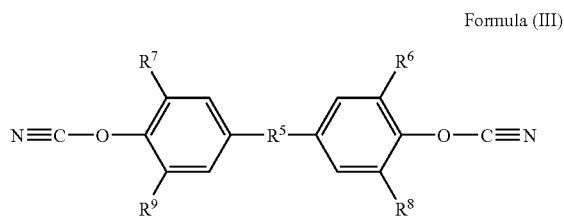

$R^5$ in the formula is a group represented by

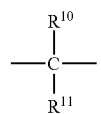

(wherein, $R^{10}$, $R^{11}$ are independently a hydrogen atom or an unsubstituted or fluorine-substituted methyl group),

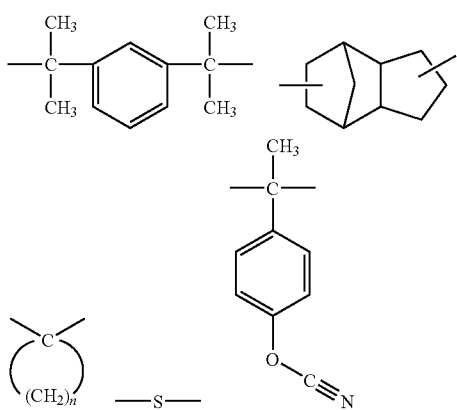
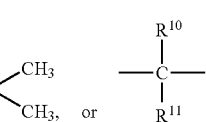
wherein, n is an integer of 4~12, $R^6$, $R^7$, $R^8$ and $R^9$ are independently a hydrogen atom or an unsubstituted or fluorine-substituted methyl group.
* * * * *